United States Patent
Lindskog et al.

(10) Patent No.: US 6,597,680 B1
(45) Date of Patent: Jul. 22, 2003

(54) PACKET TRAFFIC CHANNEL REASSIGNMENT

(75) Inventors: Jan Lindskog, Pixbo (SE); Gunnar Rydnell, Rävlanda (SE); Anders Lundström, Karlstad (SE); Anders Hoff, Hägersten (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/192,938

(22) Filed: Nov. 16, 1998

(51) Int. Cl.[7] .................................................. H04J 3/16
(52) U.S. Cl. ....................................... 370/347; 370/442
(58) Field of Search ................................. 370/347, 441, 370/332, 338, 403, 241, 389, 465, 468, 311, 321, 324, 350, 337, 336, 341, 349, 392, 396, 390, 442, 466, 467, 503, 351, 352, 401; 714/746, 747, 752, 754, 758, 761, 762, 764, 768; 455/422, 423, 502, 503, 509, 515, 516, 517

(56) References Cited

U.S. PATENT DOCUMENTS

| | | | |
|---|---|---|---|
| 4,887,265 A | | 12/1989 | Felix .......................... 370/94.1 |
| 4,916,691 A | | 4/1990 | Goodman ...................... 370/60 |
| 5,142,539 A | | 8/1992 | Dahlin et al. ............... 371/37.1 |
| 5,175,867 A | | 12/1992 | Wejke et al. ............... 455/33.1 |
| 5,590,133 A | * | 12/1996 | Billstrom et al. ........... 370/349 |
| 5,603,081 A | | 2/1997 | Raith et al. ................. 455/33.1 |
| 5,610,917 A | | 3/1997 | Diachina ..................... 370/469 |
| 5,745,523 A | | 4/1998 | Dent et al. .................. 375/216 |
| 5,790,551 A | | 8/1998 | Chan .......................... 370/458 |
| 6,014,429 A | * | 1/2000 | LaPorta et al. .......... 379/88.15 |
| 6,141,347 A | * | 10/2000 | Shaughnessy et al. ...... 370/312 |
| 6,377,548 B1 | * | 4/2002 | Chuah ........................ 370/233 |

FOREIGN PATENT DOCUMENTS

| | | |
|---|---|---|
| WO | WO96/22665 | 7/1996 |
| WO | WO97/15165 | 4/1997 |
| WO | WO97/22216 | 6/1997 |
| WO | WO98/48581 | 10/1998 |

OTHER PUBLICATIONS

P. Decker et al., "A General Packet Radio Service Proposed for GSM", Communication Networks—Aachen Univ. of Technology, Oct. 13, 1993.
P. Decker, "Packet Radio in GSM", Communication Networks—Aachen Univ. of Technology, Feb. 12, 1993.
Jari Hamalainen et al., "Packet Data Over GSM Network", T DOC SMG 1 238/93 ETSI,, Sep. 28, 1993.
K. Felix, "Packet Switching in Digital Cellular Systems", Proc. 38th IEEE Vehicular Technology Conf., Jun. 1988, pp. 414–418.
"Cellular System Dual Mode Mobile Station—Base Station Compatibility Standard", TIA/EIA/IS–54, Apr. 1998.
TIA/EIA/IS–136.2–A, Mar. 21, 1996, Published Version, 7 pages.

* cited by examiner

Primary Examiner—Dang Ton

(57) ABSTRACT

The present invention provides a method and system for quickly deallocating packet traffic channels. According to exemplary embodiments of the present invention, the capability of performing point-to-multipoint communications is provided on the PTCH by defining a multicast address that all mobiles read. Through the use of a multicast address, a plurality of mobile stations can simultaneously be notified of the termination of PTCH services. As a result, the network can reallocate PTCH resources in a minimum amount of time.

18 Claims, 11 Drawing Sheets

PACKET TRAFFIC CHANNEL REASSIGNMENT

BACKGROUND

The present invention relates generally to radiocommunication systems and, more particularly, to techniques and structures for reassigning packet traffic channels in a radiocommunication system.

In North America, digital communication and multiple access techniques such as TDMA are currently provided by a digital cellular radiotelephone system called the digital advanced mobile phone service (D-AMPS), some of the characteristics of which are specified in the interim standard TIA/EIA/IS-54, "Dual-Mode Mobile Station-Base Station Compatibility Standard", published by the Telecommunications Industry Association and Electronic Industries Association (TIA/EIA), which is expressly incorporated herein by reference. Because of a large existing consumer base of equipment operating only in the analog domain with frequency-division multiple access (FDMA), TIA/EIA/IS-54 is a dual-mode (analog and digital) standard, providing for analog compatibility together with digital communication capability. For example, the TIA/EIA/IS-54 standard provides for both FDMA analog voice channels (AVC) and TDMA digital traffic channels (DTC). The AVCs and DTCs are implemented by frequency modulating radio carrier signals, which have frequencies near 800 megahertz (MHz) such that each radio channel has a spectral width of 30 kilohertz (KHz).

In a TDMA cellular radiotelephone system, each radio channel is divided into a series of time slots, each of which contains a burst of information from a data source, e.g., a digitally encoded portion of a voice conversation. The time slots are grouped into successive TDMA frames having a predetermined duration. The number of time slots in each TDMA frame is related to the number of different users that can simultaneously share the radio channel. If each slot in a TDMA frame is assigned to a different user, the duration of a TDMA frame is the minimum amount of time between successive time slots assigned to the same user.

The successive time slots assigned to the same user, which are usually not consecutive time slots on the radio carrier, constitute the user's digital traffic channel, which may be considered a logical channel assigned to the user. As described in more detail below, digital control channels (DCCHs) can also be provided for communicating control signals, and such a DCCH is a logical channel formed by a succession of usually non-consecutive time slots on the radio carrier.

In only one of many possible embodiments of a TDMA system as described above, the TIA/EIA/IS-54 standard provided that each TDMA frame consists of six consecutive time slots and has a duration of 40 milliseconds (msec). Thus, each radio channel can carry from three to six DTCs (e.g., three to six telephone conversations), depending on the source rates of the speech coder/decoders (codecs) used to digitally encode the conversations. Such speech codecs can operate at either full-rate or half-rate. A full-rate DTC requires twice as many time slots in a given time period as a half-rate DTC, and in TIA/EIA/IS-54, each full-rate DTC uses two slots of each TDMA frame, i.e., the first and fourth, second and fifth, or third and sixth of a TDMA frame's six slots. Each half-rate DTC uses one time slot of each TDMA frame. During each DTC time slot, 324 bits are transmitted, of which the major portion, 260 bits, is due to the speech output of the codec, including bits due to error correction coding of the speech output, and the remaining bits are used for guard times and overhead signalling for purposes such as synchronization.

It can be seen that the TDMA cellular system operates in a buffer-and-burst, or discontinuous-transmission, mode: each mobile station transmits (and receives) only during its assigned time slots. At full rate, for example, a mobile station might transmit during slot 1, receive during slot 2, idle during slot 3, transmit during slot 4, receive during slot 5, and idle during slot 6, and then repeat the cycle during succeeding TDMA frames. Therefore, the mobile station, which may be battery-powered, can be switched off, or sleep, to save power during the time slots when it is neither transmitting nor receiving.

In addition to voice or traffic channels, cellular radio communication systems also provide paging/access, or control, channels for carrying call-setup messages between base stations and mobile stations. According to TIA/EIA/IS-54, for example, there are twenty-one dedicated analog control channels (ACCs), which have predetermined fixed frequencies for transmission and reception located near 800 MHz. Since these ACCs are always found at the same frequencies, they can be readily located and monitored by the mobile stations.

For example, when in an idle state (i.e., switched on but not making or receiving a call), a mobile station in a TIA/EIA/IS-54 system tunes to and then regularly monitors the strongest control channel (generally, the control channel of the cell in which the mobile station is located at that moment) and may receive or initiate a call through the corresponding base station. When moving between cells while in the idle state, the mobile station will eventually "lose" radio connection on the control channel of the "old" cell and tune to the control channel of the "new" cell. The initial tuning and subsequent re-tuning to control channels are both accomplished automatically by scanning all the available control channels at their known frequencies to find the "best" control channel. When a control channel with good reception quality is found, the mobile station remains tuned to this channel until the quality deteriorates again. In this way, mobile stations stay "in touch" with the system.

While in the idle state, a mobile station must monitor the control channel for paging messages addressed to it. For example, when an ordinary telephone (land-line) subscriber calls a mobile subscriber, the call is directed from the public switched telephone network (PSTN) to a mobile switching center (MSC) that analyzes the dialed number. If the dialed number is validated, the MSC requests some or all of a number of radio base stations to page the called mobile station by transmitting over their respective control channels paging messages that contain the mobile identification number (MIN) of the called mobile station. Each idle mobile station receiving a paging message compares the received MIN with its own stored MIN. The mobile station with the matching stored MIN transmits a page response over the particular control channel to the base station, which forwards the page response to the MSC.

Upon receiving the page response, the MSC selects an AVC or a DTC available to the base station that received the page response, switches on a corresponding radio transceiver in that base station, and causes that base station to send a message via the control channel to the called mobile station that instructs the called mobile station to tune to the selected voice or traffic channel. A through-connection for the call is established once the mobile station has tuned to the selected AVC or DTC.

The performance of the system having ACCs that is specified by TIA/EIA/IS-54 has been improved in a system having digital control channels (DCCHs) that is specified in TIA/EIA/IS-136, which is expressly incorporated by reference herein. One example of such a system having DCCHs with new formats and processes is described in U.S. patent application Ser. No. 07/956,640 entitled "Digital Control Channel", which was filed on Oct. 5, 1992, and which is incorporated in this application by reference. Using such DCCHs, each TIA/EIA/IS-54 radio channel can carry DTCs only, DCCHs only, or a mixture of both DTCs and DCCHs. Within the TIA/EIA/IS-136 framework, each radio carrier frequency can have up to three full-rate DTCs/DCCHs, or six half-rate DTCs/DCCHs, or any combination in between, for example, one full-rate and four half-rate DTCs/DCCHs.

In general, however, the transmission rate of the DCCH need not coincide with the half-rate and full-rate specified in TIA/EIA/IS-54, and the length of the DCCH slots may not be uniform and may not coincide with the length of the DTC slots. The DCCH may be defined on an TIA/EIA/IS-54 radio channel and may consist, for example, of every n-th slot in the stream of consecutive TDMA slots. In this case, the length of each DCCH slot may or may not be equal to 6.67 msec, which is the length of a DTC slot according to TIA/EIA/IS-54. Alternatively (and without limitation on other possible alternatives), these DCCH slots may be defined in other ways known to one skilled in the art.

In cellular telephone systems, an air link protocol is required in order to allow a mobile station to communicate with the base stations and MSC. The communications link protocol is used to initiate and to receive cellular telephone calls. As described in U.S. patent application Ser. No. 08/477,574 entitled "Layer 2 Protocol for the Random Access Channel and the Access Response Channel," which was filed on Jun. 7, 1995, and which is incorporated in this application by reference, the communications link protocol is commonly referred to within the communications industry as a Layer 2 protocol, and its functionality includes the delimiting, or framing, of Layer 3 messages. These Layer 3 messages may be sent between communicating Layer 3 peer entities residing within mobile stations and cellular switching systems. The physical layer (Layer 1) defines the parameters of the physical communications channel, e.g., radio frequency spacing, modulation characteristics, etc. Layer 2 defines the techniques necessary for the accurate transmission of information within the constraints of the physical channel, e.g., error correction and detection, etc. Layer 3 defines the procedures for reception and processing of information transmitted over the physical channel.

Communications between mobile stations and the cellular switching system (the base stations and the MSC) can be described in general with reference to FIGS. 1 and 2. FIG. 1 schematically illustrates pluralities of Layer 3 messages 11, Layer 2 frames 13, and Layer 1 channel bursts, or time slots, 15. In FIG. 1, each group of channel bursts corresponding to each Layer 3 message may constitute a logical channel, and as described above, the channel bursts for a given Layer 3 message would usually not be consecutive slots on an TIA/EIA/136 carrier. On the other hand, the channel bursts could be consecutive; as soon as one time slot ends, the next time slot could begin.

Each Layer 1 channel burst 15 contains a complete Layer 2 frame as well as other information such as, for example, error correction information and other overhead information used for Layer 1 operation. Each Layer 2 frame contains at least a portion of a Layer 3 message as well as overhead information used for Layer 2 operation. Although not indicated in FIG. 1, each Layer 3 message would include various information elements that can be considered the payload of the message, a header portion for identifying the respective message's type, and possibly padding.

Each Layer 1 burst and each Layer 2 frame is divided into a plurality of different fields. In particular, a limited-length DATA field in each Layer 2 frame contains the Layer 3 message 11. Since Layer 3 messages have variable lengths depending upon the amount of information contained in the Layer 3 message, a plurality of Layer 2 frames may be needed for transmission of a single Layer 3 message. As a result, a plurality of Layer 1 channel bursts may also be needed to transmit the entire Layer 3 message as there is a one-to-one correspondence between channel bursts and Layer 2 frames.

As noted above, when more than one channel burst is required to send a Layer 3 message, the several bursts are not usually consecutive bursts on the radio channel. Moreover, the several bursts are not even usually successive bursts devoted to the particular logical channel used for carrying the Layer 3 message. Since time is required to receive, process, and react to each received burst, the bursts required for transmission of a Layer 3 message are usually sent in a staggered format, as schematically illustrated in FIG. 2(a) and as described above in connection with the TIA/EIA/IS-136 standard.

FIG. 2(a) shows a general example of a forward (or downlink) DCCH configured as a succession of time slots 1, 2, ..., N, ... included in the consecutive time slots 1, 2, ... sent on a carrier frequency. These DCCH slots may be defined on a radio channel such as that specified by TIA/EIA/IS-136, and may consist, as seen in FIG. 2(a) for example, of every n-th slot in a series of consecutive slots. Each DCCH slot has a duration that may or may not be 6.67 msec, which is the length of a DTC slot according to the TIA/EIA/IS-136 standard.

As shown in FIG. 2(a), the DCCH slots may be organized into superframes (SF), and each superframe includes a number of logical channels that carry different kinds of information. One or more DCCH slots may be allocated to each logical channel in the superframe. The exemplary downlink superframe in FIG. 2(a) includes three logical channels: a broadcast control channel (BCCH) including six successive slots for overhead messages; a paging channel (PCH) including one slot for paging messages; and an access response channel (ARCH) including one slot for channel assignment and other messages. The remaining time slots in the exemplary superframe of FIG. 2 may be dedicated to other logical channels, such as additional paging channels PCH or other channels. Since the number of mobile stations is usually much greater than the number of slots in the superframe, each paging slot is used for paging several mobile stations that share some unique characteristic, e.g., the last digit of the MIN.

FIG. 2(b) illustrates an exemplary information format for the slots of a forward DCCH. FIG. 2(b) indicates the number of bits in each field above that field. The bits sent in the SYNC information are used in a conventional way to help ensure accurate reception of the coded superframe phase (CSFP) and DATA fields. The SYNC information carries a predetermined bit pattern used by the base stations to find the start of the slot. The shared channel feedback (SCF) information is used to control a random access channel (RACH), which is used by the mobile to request access to the system. The CSFP information conveys a coded superframe phase value that enables the mobile stations to find the start of each superframe. This is just one example for the information format in the slots of the forward DCCH.

For purposes of efficient sleep mode operation and fast cell selection, the BCCH may be divided into a number of sub-channels. U.S. patent application Ser. No. 07/956,640 discloses a BCCH structure that allows the mobile station to read a minimum amount of information when it is switched on (when it locks onto a DCCH) before being able to access the system (place or receive a call). After being switched on, an idle mobile station needs to regularly monitor only its assigned PCH slots (usually one in each superframe); the mobile can sleep during other slots. The ratio of the mobile's time spent reading paging messages and its time spent asleep is controllable and represents a tradeoff between call-set-up delay and power consumption.

Since each TDMA time slot has a certain fixed information carrying capacity, each burst typically carries only a portion of a Layer 3 message as noted above. In the uplink direction, multiple mobile stations attempt to communicate with the system on a contention basis, while multiple mobile stations listen for Layer 3 messages sent from the system in the downlink direction. In known systems, any given Layer 3 message is carried using as many TDMA channel bursts as required to send the entire Layer 3 message.

Digital control and traffic channels are desirable for these and other reasons described in U.S. patent application Ser. No. 08/147,254, entitled "A Method for Communicating in a Wireless Communication System", which was filed on Nov. 1, 1993, and which is incorporated herein by reference. For example, they support longer sleep periods for the mobile units, which results in longer battery life.

Digital traffic channels and digital control channels have expanded functionality for optimizing system capacity and supporting hierarchical cell structures, i.e., structures of macrocells, microcells, picocells, etc. The term "macrocel" generally refers to a cell having a size comparable to the sizes of cells in a conventional cellular telephone system (e.g., a radius of at least about 1 kilometer), and the terms "microcell" and "picocell" generally refer to progressively smaller cells. For example, a microcell might cover a public indoor or outdoor area, e.g., a convention center or a busy street, and a picocell might cover an office corridor or a floor of a high-rise building. From a radio coverage perspective, macrocells, microcells, and picocells may be distinct from one another or may overlap one another to handle different traffic patterns or radio environments.

The systems specified by the TIA/EIA/IS-54 and TIA/EIA/IS-136 standards are circuit-switched technology, which is a type of "connection-oriented" communication that establishes a physical call connection and maintains that connection for as long as the communicating end-systems have data to exchange. The direct connection of a circuit switch serves as an open pipeline, permitting the end-systems to use the circuit for whatever they deem appropriate. While circuit-switched data communication may be well suited to constant-bandwidth applications, it is relatively inefficient for low-bandwidth and "bursty" applications.

Packet-switched technology, which may be connection-oriented (e.g., X.25) or "connectionless" (e.g., the Internet Protocol, "IP"), does not require the set-up and tear-down of a physical connection, which is in marked contrast to circuit-switched technology. This reduces the data latency and increases the efficiency of a channel in handling relatively short, bursty, or interactive transactions. A connectionless packet-switched network distributes the routing functions to multiple routing sites, thereby avoiding possible traffic bottlenecks that could occur when using a central switching hub. Data is "packetized" with the appropriate end-system addressing and then transmitted in independent units along the data path. Intermediate systems, sometimes called "routers", stationed between the communicating end-systems make decisions about the most appropriate route to take on a per packet basis. Routing decisions are based on a number of characteristics, including: least-cost route or cost metric; capacity of the link; number of packets waiting for transmission; security requirements for the link; and intermediate system (node) operational status.

Packet transmission along a route that takes into consideration path metrics, as opposed to a single circuit set up, offers application and communications flexibility. It is also how most standard local area networks (LANs) and wide area networks (WANs) have evolved in the corporate environment. Packet switching is appropriate for data communications because many of the applications and devices used, such as keyboard terminals, are interactive and transmit data in bursts. Instead of a channel being idle while a user inputs more data into the terminal or pauses to think about a problem, packet switching interleaves multiple transmissions from several terminals onto the channel.

Packet data provides more network robustness due to path independence and the routers' ability to select alternative paths in the event of network node failure. Packet switching, therefore, allows for more efficient use of the network lines. Packet technology offers the option of billing the end user based on amount of data transmitted instead of connection time. If the end user's application has been designed to make efficient use of the air link, then the number of packets transmitted will be minimal. If each individual user's traffic is held to a minimum, then the service provider has effectively increased network capacity.

Packet networks are usually designed and based on industry-wide data standards such as the open system interface (OSI) model or the TCP/IP protocol stack. These standards have been developed, whether formally or de facto, for many years, and the applications that use these protocols are readily available. The main objective of standards-based networks is to achieve interconnectivity with other networks. The Internet is today's most obvious example of such a standards-based network pursuit of this goal.

Packet networks, like the Internet or a corporate LAN, are integral parts of today's business and communications environments. As mobile computing becomes pervasive in these environments, wireless service providers such as those using TIA/EIA/IS-136 are best positioned to provide access to these networks. Nevertheless, the data services provided by or proposed for cellular systems are generally based on the circuit-switched mode of operation, using a dedicated radio channel for each active mobile user.

FIG. 3 shows representative architecture used for communicating across an air link that comprises the protocols which provide connectivity between a mobile end system (M-ES), a mobile data base station (MDBS), and a mobile data intermediate system (MD-IS). An exemplary description of the elements in FIG. 3 and a recommended approach for each element when considering alternative RF technologies follows.

The Internet Protocol/Connectionless Network Protocol (IP/CLNP) are network protocols that are connectionless and widely supported throughout the traditional data network community. These protocols are independent of the physical layer and preferably are not modified as the RF technologies change.

The Security Management Protocol (SMP) provides security services across the air link interface. The services furnished include data link confidentiality, M-ES authentication, key management, access control, and algorithm upgradability/replacement. The SMP should remain unchanged when implementing alternative RF technologies.

The Radio Resource Management Protocol (RRMP) provides management and control over the mobile unit's use of the RF resources. The RRMP and its associated procedures are specific to the AMPS RF infrastructure and require change based on the RF technology implemented.

The Mobile Network Registration Protocol (MNRP) is used in tandem with a Mobile Network Location Protocol (MNLP) to allow proper registration and authentication of the mobile end system. The MNRP should be unchanged when using alternative RF technologies.

The Mobile Data Link Protocol (MDLP) provides efficient data transfer between the MD-IS and the M-ES. The MDLP supports efficient mobile system movement, mobile system power conservation, RF channel resources sharing, and efficient error recovery. The MDLP should be unchanged when using alternative RF technologies.

The Medium Access Control (MAC) protocol and associated procedures control the methodology M-ESs use to manage shared access to the RF channel. This protocol and its functionality must be supplied by alternative RF technologies.

Modulation and encoding schemes are used at the physical layer. These schemes are specific to the RF technology employed, and therefore should be replaced with schemes appropriate for the alternative RF technology. The adoption of alternative RF technologies can be implemented with a minimum amount of change to the CDPD system architecture. The required changes are limited to the radio resource management protocol, the MAC, and physical layers; all other network services and support services remain unchanged.

A few exceptions to data services for cellular systems based on the circuit-switched mode of operation are described in the following documents, which include the packet data concepts.

U.S. Pat. No. 4,887,265 and "Packet Switching in Digital Cellular Systems", Proc. 38th IEEE Vehicular Technology Conf., pp. 414–418 (June 1988) describe a cellular system providing shared packet data radio channels, each one capable of accommodating multiple data calls. A mobile station requesting packet data service is assigned to a particular packet data channel using essentially regular cellular signalling. The system may include packet access points (PAPS) for interfacing with packet data networks. Each packet data radio channel is connected to one particular PAP and is thus capable of multiplexing data calls associated with that PAP. Handovers are initiated by the system in a manner that is largely similar to the handover used in the same system for voice calls. A new type of handover is added for those situations when the capacity of a packet channel is insufficient.

These documents are data-call oriented and based on using system-initiated handover in a similar way as for regular voice calls. Applying these principles for providing general purpose packet data services in a TDMA cellular system would result in spectrum inefficiency and performance disadvantages.

U.S. Pat. No. 4,916,691 describes a new packet mode cellular radio system architecture and a new procedure for routing (voice and/or data) packets to a mobile station. Base stations, public switches via trunk interface units, and a cellular control unit are linked together via a WAN. The routing procedure is based on mobile station-initiated handovers and on adding to the header of any packet transmitted from a mobile station (during a call) an identifier of the base station through which the packet passes. In case of an extended period of time between subsequent user information packets from a mobile station, the mobile station may transmit extra control packets for the purpose of conveying cell location information.

The cellular control unit is primarily involved at call establishment, when it assigns to the call a call control number. It then notifies the mobile station of the call control number and the trunk interface unit of the call control number and the identifier of the initial base station. During a call, packets are then routed directly between the trunk interface unit and the currently serving base station.

The system described in U.S. Pat. No. 4,916,691 is not directly related to the specific problems of providing packet data services in TDMA cellular systems.

"Packet Radio in GSM", European Telecommunications Standards Institute (ETSI) T Doc SMG 4 58/93 (Feb. 12, 1993) and "A General Packet Radio Service Proposed for GSM" presented during a seminar entitled "GSM in a Future Competitive Environment", Helsinki, Finland (Oct. 13, 1993) outline a possible packet access protocol for voice and data in GSM. These documents directly relate to TDMA cellular systems, i.e., GSM, and although they outline a possible organization of an optimized shared packet data channel, they do not deal with the aspects of integrating packet data channels in a total system solution.

"Packet Data over GSM Network", T Doc SMG 1 238/93, ETSI (Sep. 28, 1993) describes a concept of providing packet data services in GSM based on first using regular GSM signalling and authentication to establish a virtual channel between a packet mobile station and an "agent" handling access to packet data services. With regular signalling modified for fast channel setup and release, regular traffic channels are then used for packet transfer. This document directly relates to TDMA cellular systems, but since the concept is based on using a "fast switching" version of existing GSM traffic channels, it has disadvantages in terms of spectrum efficiency and packet transfer delays (especially for short messages) compared to a concept based on optimized shared packet data channels.

New standards are currently being settled for integrated voice and packet data services in ANSI-136 systems. A forthcoming version of the standard will provide the ability to create an effective radio resource utilization for the voice and packet data services supplied. One such attempt to provide an effective radio resource for voice and packet data services is described in U.S. Pat. No. 5,790,551 to Chan. A dynamic channel assignment technique is disclosed therein where the network provides to a mobile user, in response to a request from the mobile for assignment of a channel on which to transmit data, a particular channel and particular time slots on which the mobile may transmit. As such, no channels are specifically dedicated to data transmissions; rather, the network determines a channel that is free for a specific time period and assigns it to a specific mobile for data transmission. This document does not, however, disclose how to efficiently deallocate a packet traffic channel which is to be used for other services.

The new ANSI-136 standards will likely support two types of channels for packet data transmissions: a packet control channel (PCCH) and a packet traffic channel (PTCH). The PCCH may be either a point-to-point or point-to-multipoint channel. It is this channel on which a mobile station camps (i.e., where the mobile reads broadcast and paging information and where the mobile has random access and reserved access opportunities). The PTCH, on the other hand, is a point-to-point, reserved access only, channel. As will be appreciated by those skilled in the art, a physical channel can provide either packet data services or voice services or can simultaneously provide both packet data and voice services. Neither broadcast nor paging capabilities are included in the PTCH concept.

Upon activation, a mobile station selects a PCCH on which to camp. If multiple PCCHs exist in a cell, then the mobile station selects one depending, for example, on the mobile station's identification. For instance, if the least significant bit of the mobile station's identification is 00, the mobile station will choose one PCCH; if the least significant bit is 01, it will choose another PCCH, etc. By selecting a PCCH in the above-described manner, paging traffic is spread out over the available PCCHs.

Upon a contention-based access from the mobile station or upon receiving mobile termination data from the network, the network may direct the mobile station to tune to a specific PTCH for its packet transmission. Once on a PTCH, the network (e.g., the base station) schedules resources for the specific mobile. When the mobile has completed the transaction and a configurable inactivity timer in the mobile station expires (generally after 1 second of inactivity), the mobile station returns to camp on the original PCCH.

Once a PTCH has been assigned for packet data communications, certain situations may arise in which the PTCH is to be reassigned for voice communications. For example, if a cell has three channels which have been allotted for packet data or voice communications and no voice activity is occurring, then all three channels can be assigned for packet data communications. Thereafter, if a voice communication is requested, the resource manager notifies the packet data manager that one full channel is to be provided for the voice communications. In such an event, the packet data manager deallocates one channel from packet data communications and reallocates the channel for voice communications. A delay of 100 ms is acceptable to switch a traffic channel over from providing packet data services to providing voice services; therefore, the amount of time for deallocating an active PTCH should be minimized.

Another situation arises when, for example, the radio quality of a PTCH, which has been assigned to packet data communications, decreases below an acceptable level. In such an event, the packet data manager may decide to switch those mobile stations which are active on that PTCH to another PTCH in order to maintain end user required quality of service.

Due to the point-to-point communication aspect of the PTCH, problems arise in how best to deallocate the PTCH (i.e., how to notify the mobile stations which are currently using the PTCH that the PTCH services are being removed) so as to minimize the amount of delay to the voice users and active packet data users. One method of providing this notification is to directly send a redirect order to one mobile station at a time. When many active mobiles exist on a PTCH, the time to force all mobiles to leave the channel will be long. Another approach would be to simply turn off the packet traffic channel without informing the active mobile stations. In such an event, the mobile stations, upon receiving no more data from the network and upon the expiration of the one second activity timer, will fall back to the PCCH on which they were camped. Such a deallocation process, however, increases the time for the packet data end users to regain access to the network.

Therefore, there exists the need to be able to quickly and efficiently deallocate data packet services based on an end users' current demand or other criteria.

SUMMARY

The present invention overcomes the above-identified deficiencies in the art by providing a method and system for quickly deallocating packet traffic channels. According to exemplary embodiments of the present invention, the capability of performing point-to-multipoint communications is provided on the PTCH by defining a multicast address that all mobiles read. Through the use of a multicast address, a plurality of mobile stations can simultaneously be notified of the termination of PTCH services. As a result, the network can reallocate PTCH resources in a minimum amount of time.

BRIEF DESCRIPTION OF THE DRAWINGS

The above objects and features of the present invention will be more apparent from the following description of the preferred embodiments with reference to the accompanying drawings, wherein.

DETAILED DESCRIPTION

Figure 1:
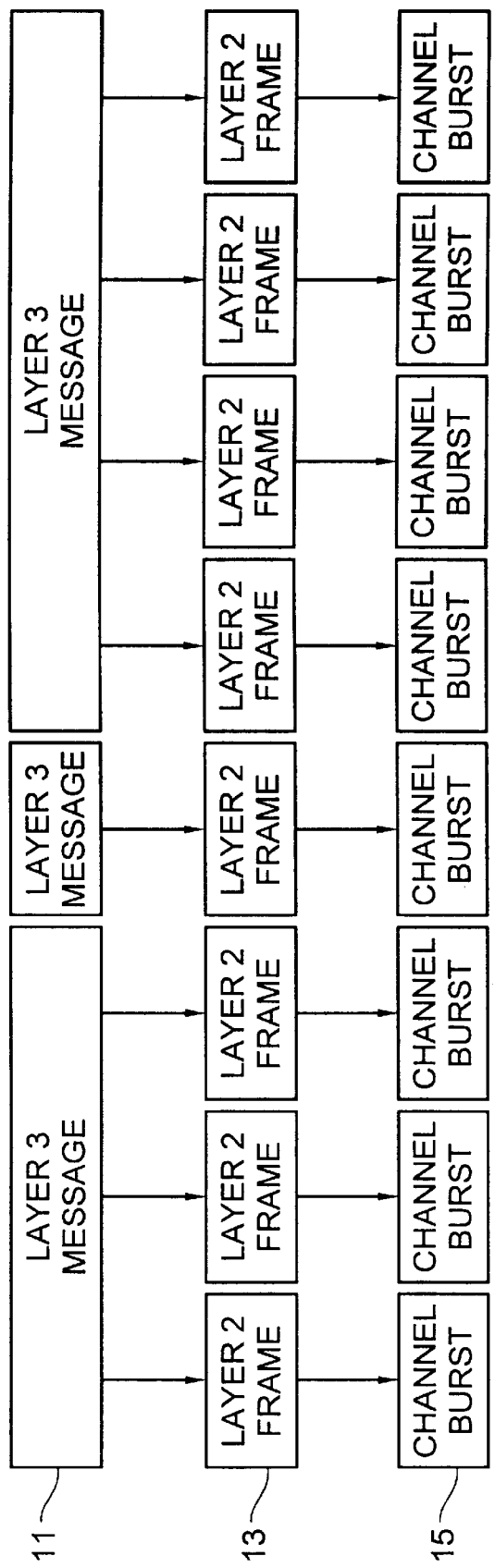
FIG. 1 schematically illustrates pluralities of Layer 3 messages, Layer 2 frames, and Layer 1 channel bursts, or time slots.
Figures 2A, 2B:
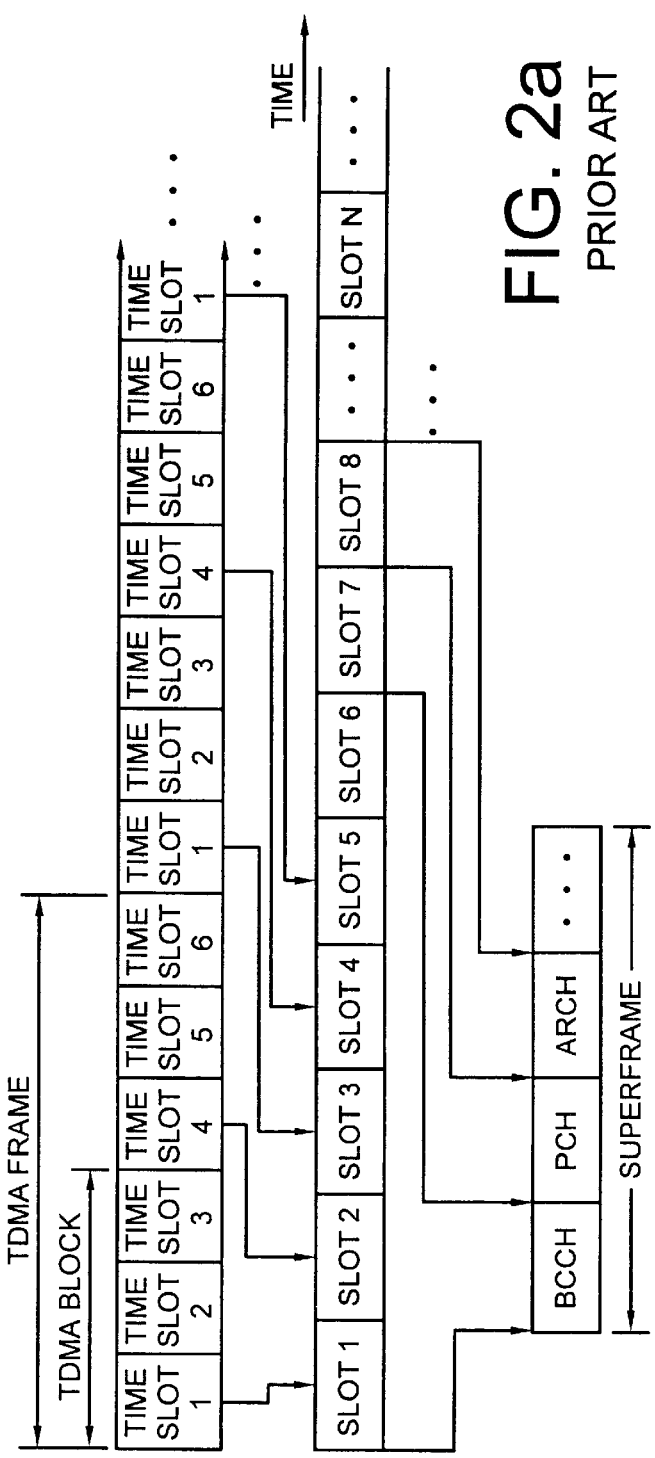
FIG. 2(a) shows a forward DCCH configured as a succession of time slots included in the consecutive time slots sent on a carrier frequency.
FIG. 2(b) shows an example of an IS-136 DCCH field slot format.
Figure 3:
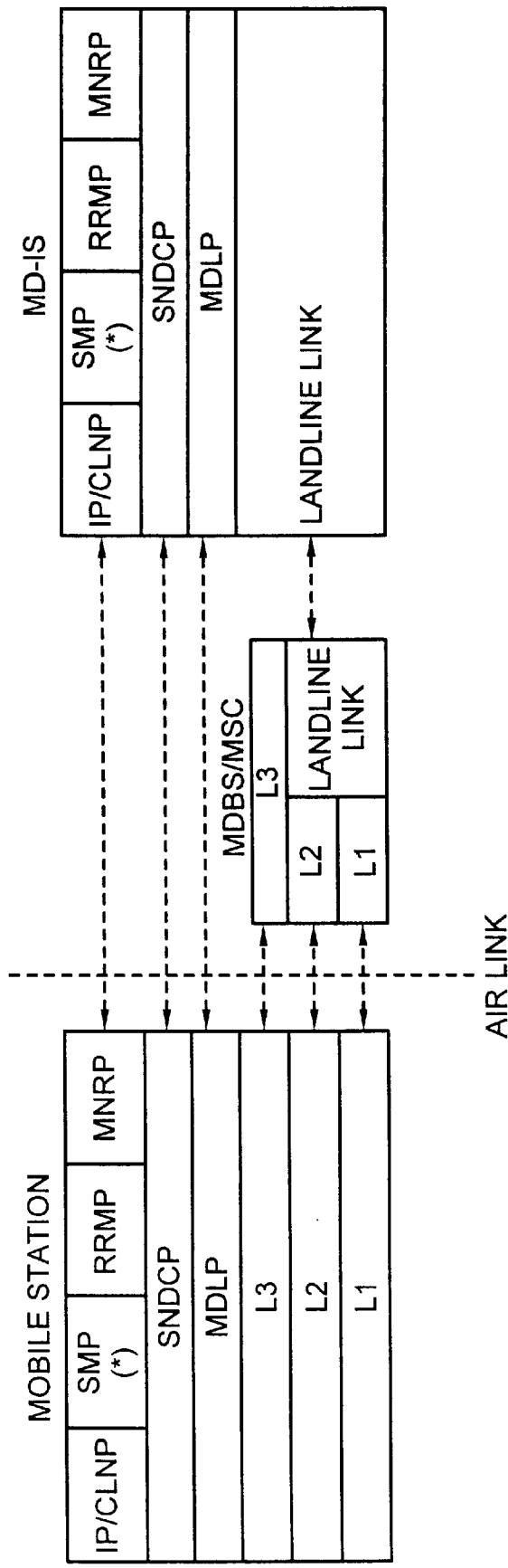
FIG. 3 illustrates a protocol architecture for communicating across an air link.
Figure 4:
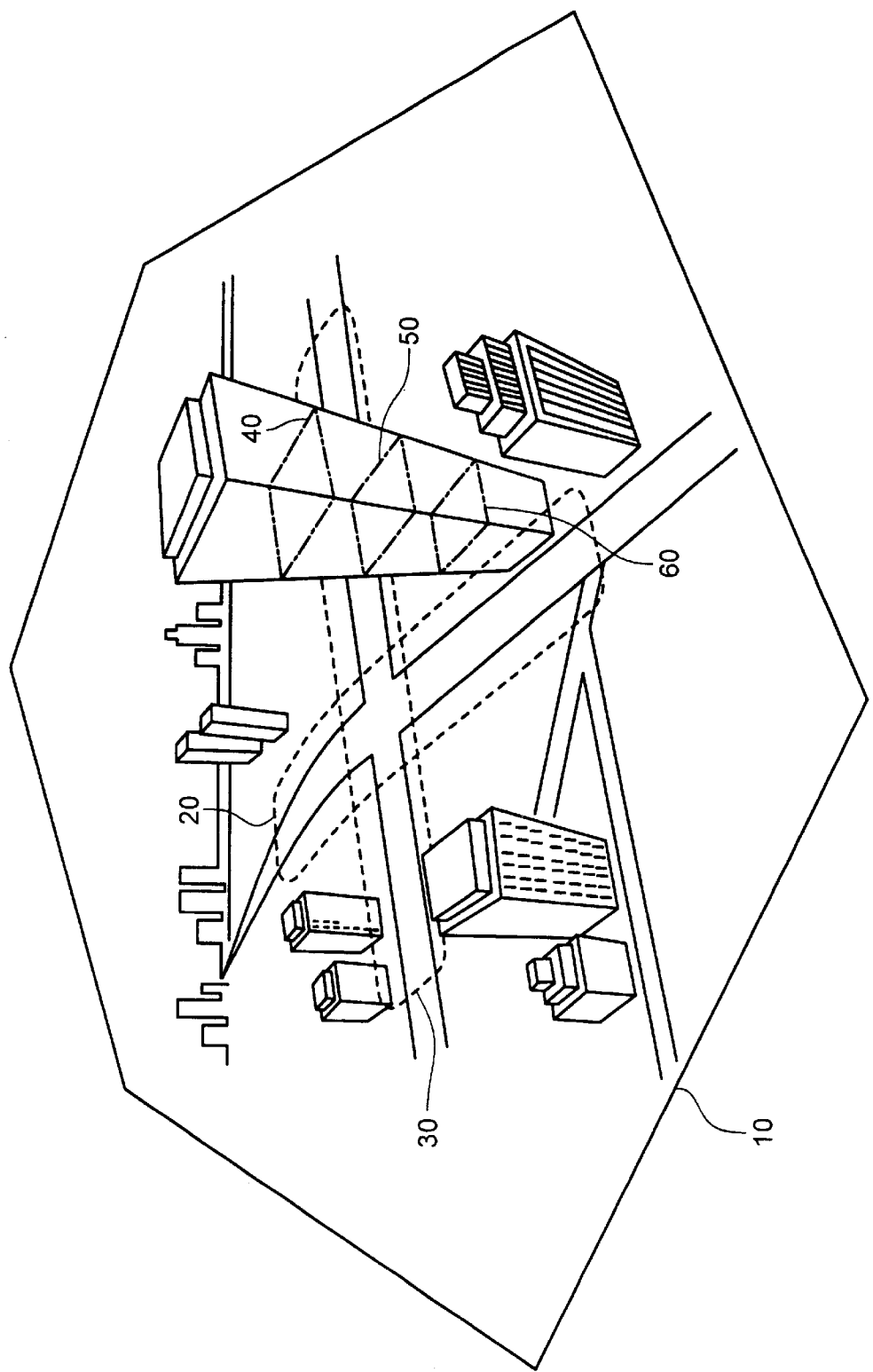
FIG. 4 illustrates an exemplary hierarchical, or multi-layered, cellular system in which the packet traffic channel deallocation technique of the present invention may be implemented.

FIG. 4 illustrates an exemplary hierarchical, or multi-layered, cellular system in which the packet traffic channel reassignment technique of the present invention may be implemented. An umbrella macrocell 10 represented by a hexagonal shape makes up an overlying cellular structure.

Each umbrella cell may contain an underlying microcell structure. The umbrella cell 10 includes microcell 20 represented by the area enclosed within the dotted line and microcell 30 represented by the area enclosed within the dashed line corresponding to areas along city streets, and picocells 40, 50, and 60, which cover individual floors of a building. The intersection of the two city streets covered by the microcells 20 and 30 may be an area of dense traffic concentration, and thus might represent a hot spot.

Figure 5:
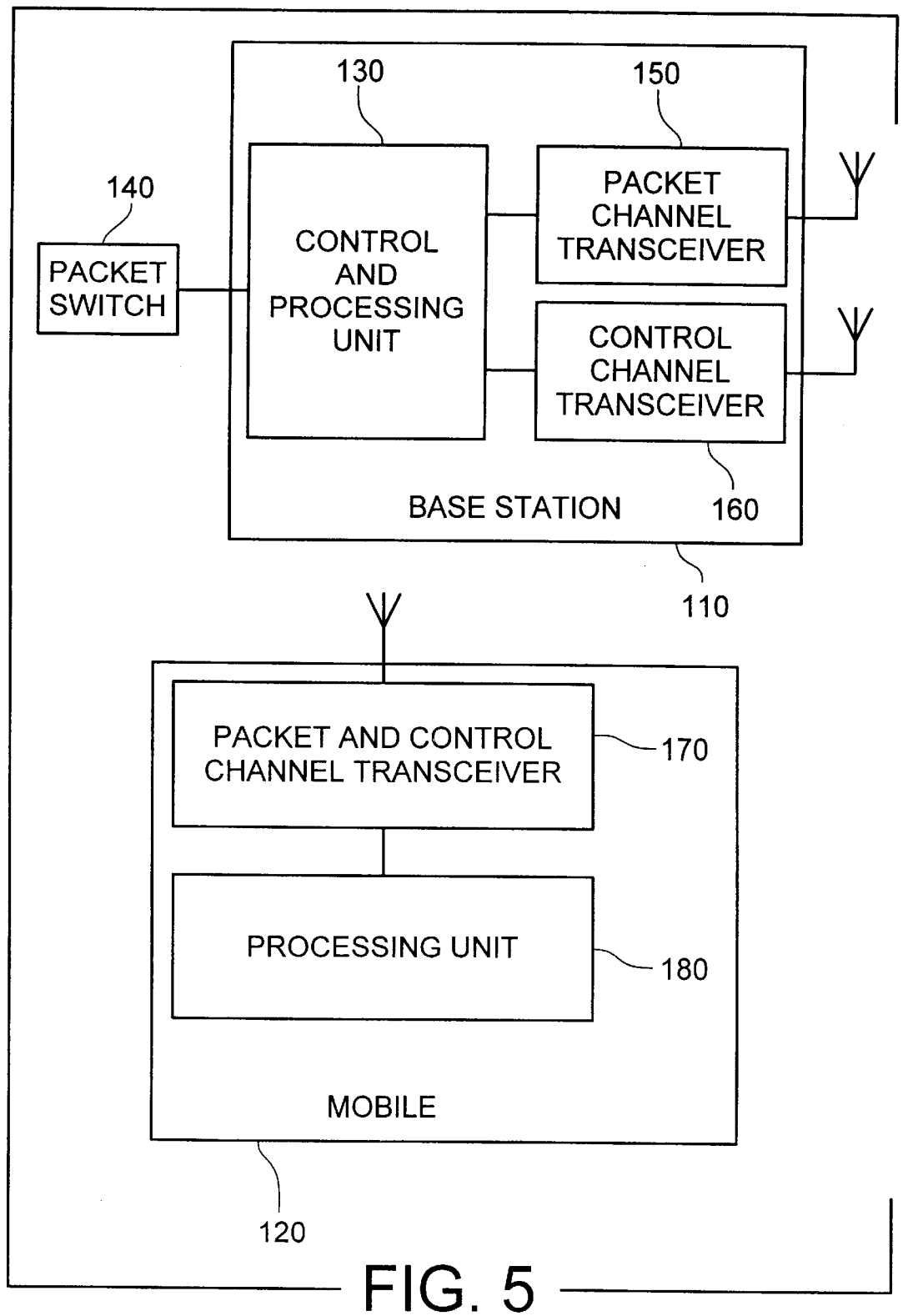
FIG. 5 is a block diagram of an exemplary cellular mobile radiotelephone system, including an exemplary base station and mobile station.

FIG. 5 illustrates an exemplary cellular mobile radiotelephone system, including an exemplary base station 110 and mobile station 120. The exemplary base station includes a control and processing unit 130 which is connected to a packet switch 140 which in turn is connected to, for example, the Internet and/or an intranet (not shown). General aspects of such cellular radiotelephone systems are known in the art, as described by the above-cited U.S. patent applications and by U.S. Pat. No. 5,175,867 to Wejke et al., entitled "Neighbor-Assisted Handoff in a Cellular Communication System," and U.S. patent application Ser. No. 07/967,027 entitled "Multi-mode Signal Processing," which was filed on Oct. 27, 1992, both of which are incorporated in this application by reference.

The exemplary base station 110 handles one or more packet traffic channels through a packet channel transceiver 150, which is controlled by the control and processing unit 130. Also, each base station includes a control channel transceiver 160, which may be capable of handling more than one packet control channel. The control channel transceiver 160 is controlled by the control and processing unit 130. The control channel transceiver 160 broadcasts control information over the control channel of the base station or cell to mobiles locked to that control channel. It will be understood that the transceivers 150 and 160 can be implemented as a single device, like the packet and control transceiver 170, for use with DCCHs and DTCs that share the same radio carrier frequency. It will be further appreciated that the base station 110 would also include one or more transceivers for handling voice channels.

The mobile station 120 receives packet data and broadcast and paging information at its packet and control channel transceiver 170. The mobile station may additionally include one or more separate transceivers (not shown) for handling voice communications. One skilled in the art will appreciate that the voice transceiver and the packet data transceiver could, in the alternative, be implemented as a single unit. The processing unit 180 controls the transceiver 170 and evaluates/processes the received information.

As set forth above, an exemplary packet data communication session between a mobile station and a base station under the IS 136 specification involves transmissions over two types of channels: a packet data control channel (PCCH) and a reserved access only, packet data traffic channel (PTCH). The PCCH contains a field in the downlink known as the packet channel feedback (PCF) field. The PCF field performs two functions: it provides feedback information as to the success or failure of a previous transmission and provides assignment information indicating which mobile station is next to transmit. All mobile stations, camped on a particular PCCH, constantly monitor the PCCH's PCF field except, as will be appreciated by one skilled in the art, in those instances when the mobile stations are in a sleep mode.

In order to gain access to the PCCH, a mobile station continuously monitors the PCF's assignment sub-field in order to detect an idle status. An idle status indicates that the next uplink slot is random access opportunity. Under the IS 136 specification, the idle status is represented by a sequence of 0's. One skilled in the art will appreciate, however, that some other predetermined sequence may alternatively be used to indicate the idle status. Once an idle status is detected, the mobile station transmits a Begin frame in the next PCCH uplink and then monitors the PCF's feedback sub-field to determine if the transmission was successful. In the Begin frame, the mobile station proposes a temporary address to be used for its identity. If the reception of the Begin frame is successful and if the temporary address is accepted by the network, the next PCF field will indicate success. If, on the other hand, the temporary address was not accepted, a different temporary address will be sent explicitly by the network in an automatic repeat request (ARQ) status frame within a specified number of slots. Thereafter, the mobile station monitors the assignment sub-field of the PCF for the presence of the temporary address which indicates that the mobile station may transmit in the next uplink. Once detected, the mobile station transmits a Continue frame.

When packet data services are requested by the mobile station, the base station, in those instances when a decision is made to off load the mobile station to a PTCH, transmits a Channel Reassignment message instructing the mobile station to tune to a new channel (i.e., a PTCH) and a temporary address which the mobile station is to use on the new channel. In response to the Channel Reassignment message, the mobile station tunes to the new channel and monitors the PCF's feedback sub-field on that channel.

Similar to the PCCH, the PTCH also includes a PCF field which is divided into a feedback sub-field and an assignment sub-field. The feedback sub-field on the PTCH downlink is set to indicate either "stop" or "continue". The presence of the "continue" indication notifies the mobile station that it is not to monitor the PCF's assignment sub-field. A "stop" indication, on the other hand, notifies the mobile station that it is to monitor the assignment sub-field. In response to a "stop" indication, the mobile station compares the address in the assignment sub-field to the mobile station's own temporary address. As with the PCCH described above, the assignment sub-field identifies an address of a mobile station which is reserved to transmit in the next uplink.

After the mobile station transmits all data intended to be transmitted, and the mobile station's activity timer expires, the mobile station switches back to the PCCH and goes into a sleep mode. In such an event, the mobile station stops using the temporary address which was assigned for the packet data transaction and uses its default decoding address. Similar to the PCCH, all active mobile stations which have reserved access to a particular PTCH continuously monitor the PTCH's PCF downlink field. One skilled in the art will appreciate that a similar communication technique to that described above is used for mobile terminated data transactions.

Figure 6:
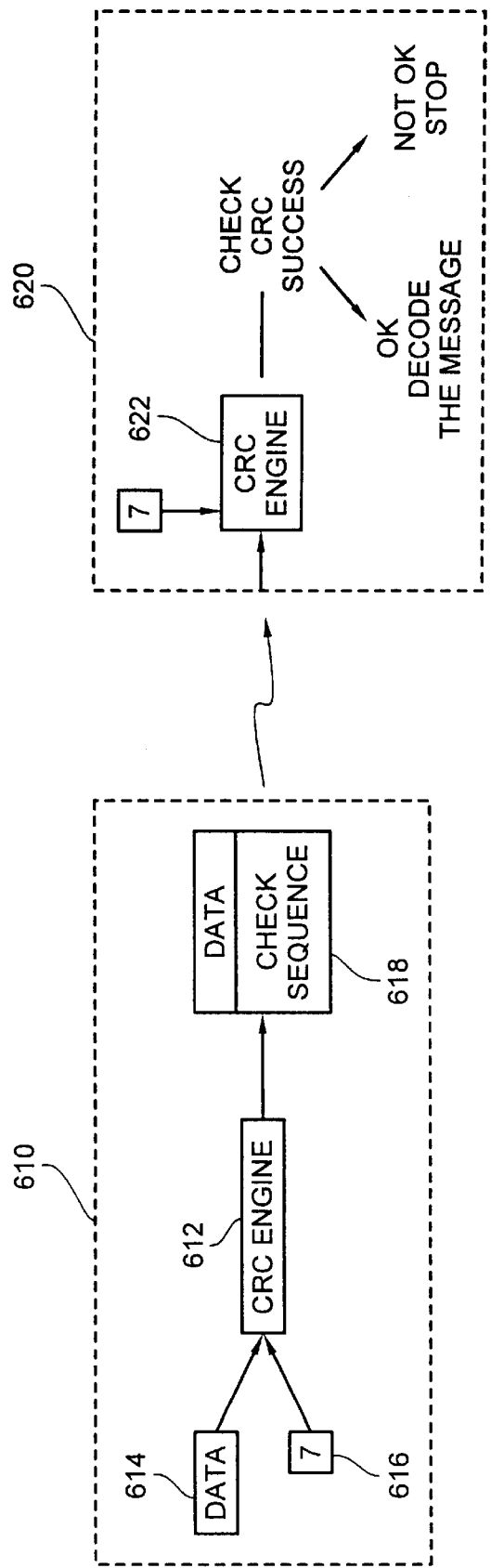
FIG. 6 illustrates a conventional communication system.

In order to illustrate the above-described point-to-point communication session on the PTCH, consider the exemplary configuration set forth in FIG. 6. Base station 610 comprises a CRC engine 612 which calculates the checksum of the data 614, which is to be transmitted, and the address 616 of the mobile station to which the data is intended. The address is then removed from the resulting packet data unit (PDU). The PDU comprises the data 614 and the resulting checksum sequence 618. For this example, it is assumed that the data is intended for the mobile station which has been assigned temporary address "7". At the mobile station 620, the PDU is processed by the CRC engine 622 in order to determine whether the message is intended for that particular mobile station. The mobile station adds its own address to the PDU and calculates the CRC for the data field and its own address. If the CRC output is equal to the received check sequence, then the data is intended for that mobile station and the mobile station decodes the message. If the CRC is unsuccessful, then the mobile station does not decode the message and continues to monitor the downlink.

As set forth above, certain situations may arise in which a network's (or base station's) PTCH services are to be terminated irrespective of ongoing or pending mobile packet data transmissions. For example, in those situations where the number of existing voice channels is insufficient, it may be desirable to remove PTCH services in order to increase the number of available voice channels. Since the PTCH has only point-to-point capabilities, delays in deallocation of PTCHs are common since each mobile is generally individually notified. As a result, a method is needed to be able to quickly and efficiently deallocate PTCH services.

According to exemplary embodiments of the present invention, point-to-multipoint capabilities are provided on the PTCH by defining a multicast address that all mobiles read in order to limit the number of redirect (or deallocation) messages required. In a first exemplary embodiment of the present invention, the multicast address is set to one of the temporary addresses which can be assigned by the network. The network can generally service only 89 active mobiles at one time due to addressing limits. If the network, for example, allots address "55" as the multicast address, then that address should not be assigned by the network as a mobile station's temporary address. As set forth in the example above, a mobile station needs to decode every PDU broadcast by the network to determine whether the address which is encoded in the PDU is equivalent to the mobile station's temporary address. When the address in the PDU is equivalent to a mobile station's temporary address, the mobile station may properly process the corresponding message.

Figure 7:
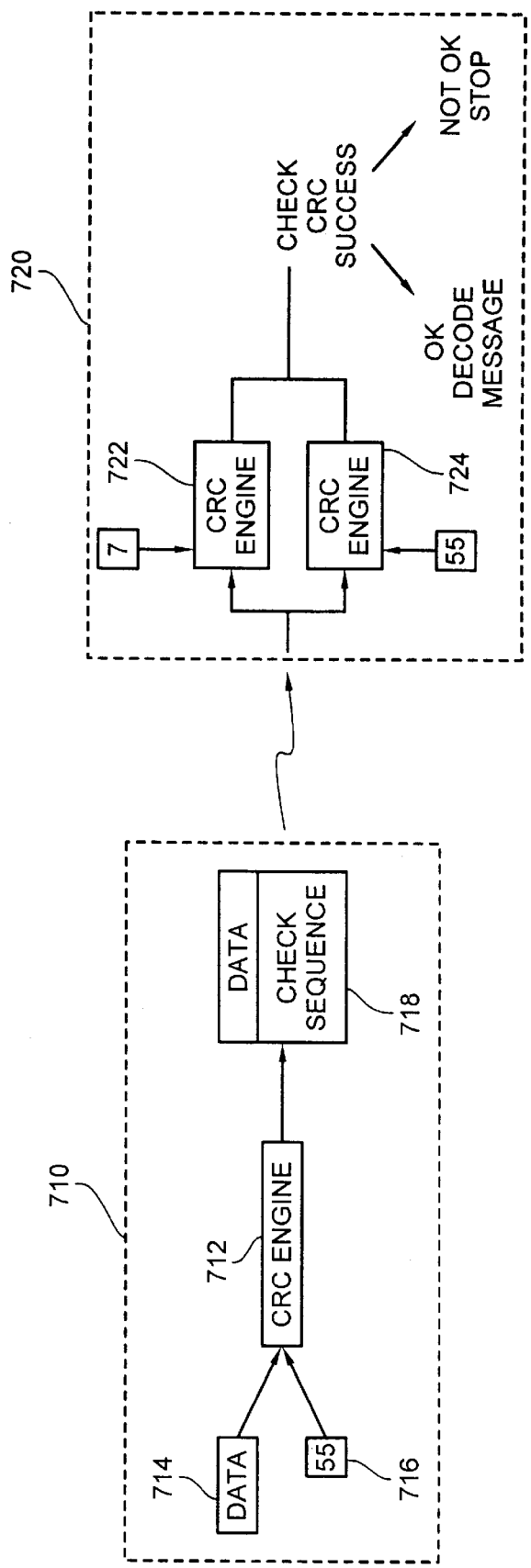
FIG. 7 illustrates a communication system according to a first embodiment of the present invention.

FIG. 7 illustrates an exemplary communication system according to the first embodiment of the present invention. The base station 710 comprises a CRC engine 712 which operates in a manner similar to that set forth above with respect to FIG. 6. The mobile station 720, according to the present embodiment, comprises two CRC engines 722 and 724. The two CRC engines allow for parallel processing of a received PDU in order to simultaneously check whether the received address equals the mobile station's temporary address or the multicast address.

When a PTCH is to be deallocated, the multicast address is set to a predetermined one of the assignable temporary addresses. For this example, the multicast address is "55" and the mobile station's address is "7". The CRC engine 712 forms the PDU from data 714 and the multicast address 716. As set forth above with respect to FIG. 6, the address is removed from the resulting PDU. The PDU that is transferred to the mobile station 720 in a downlink transmission comprises the checksum sequence 718 and the data 714. One skilled in the art will appreciate that, although only one mobile station is illustrated in FIG. 7, many mobile stations are commonly active on a PTCH, each of which is capable of performing PTCH deallocation process set forth in FIG. 8.

Figure 8:
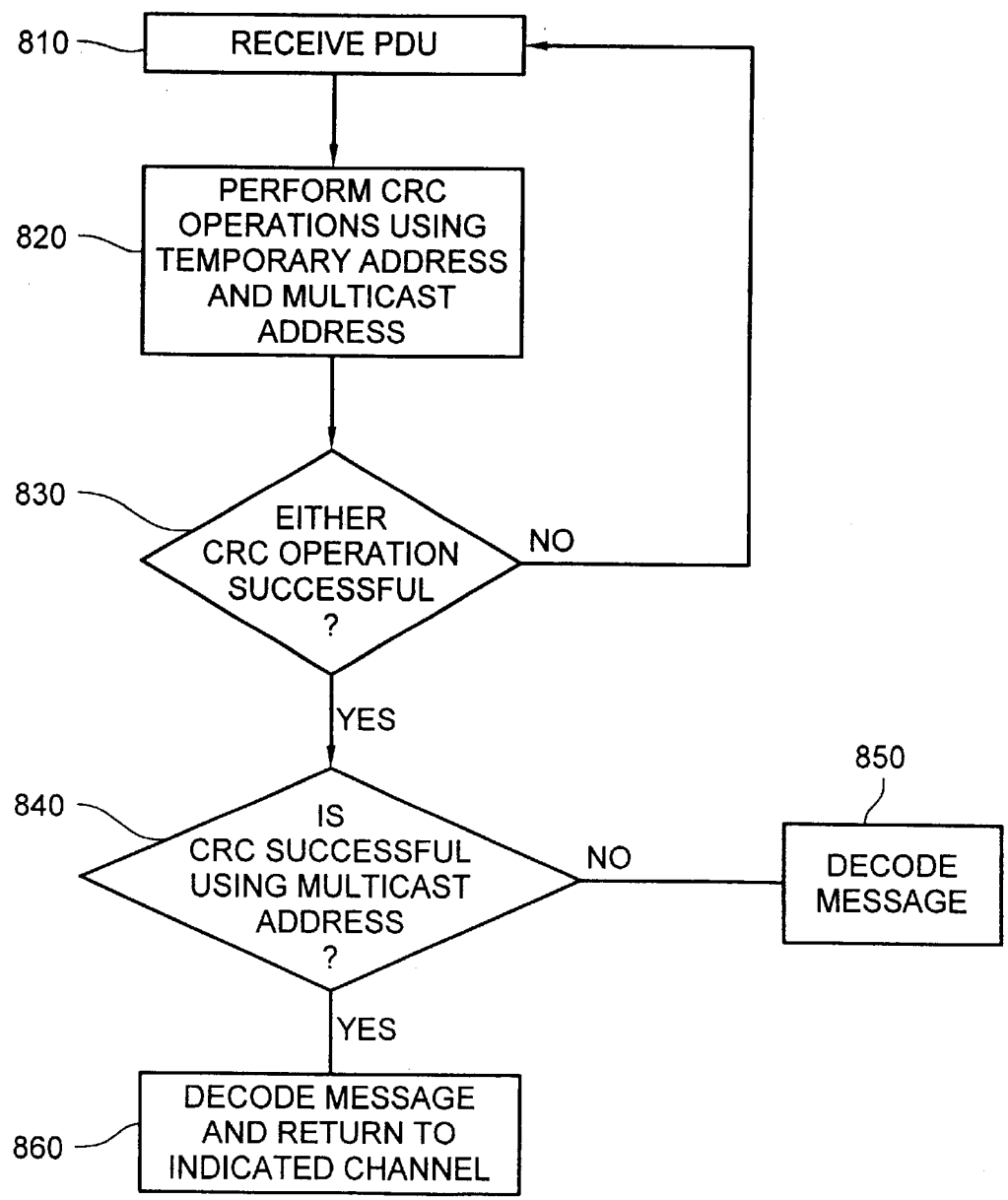
FIG. 8 illustrates the packet traffic channel deallocation process according to the first embodiment of the present invention.

FIG. 8 illustrates the PTCH deallocation process according to the first embodiment of the present invention. Once the PDU is received by the mobile station 720 (step 810), it is routed to both CRC engines 722 and 724. In CRC engine 722, the CRC operation is performed using the mobile station's temporary address "7" (step 820). In CRC engine 724, on the other hand, the CRC operation is performed using the multicast address (step 820). The success of the CRC operations is then determined (step 830). If either of these CRC operations are successful, then the message is properly decoded by the mobile station (steps 850 and 860). When PTCH resources are to be deallocated, the CRC operation will be successful using the multicast address (step 840). In such an event, the message decoded by the mobile station (step 860) will contain channel reassignment information informing the mobile station to tune to another channel. If both CRC operations are unsuccessful, then the mobile station does not decode the message and continues to monitor the downlink.

Figure 9:
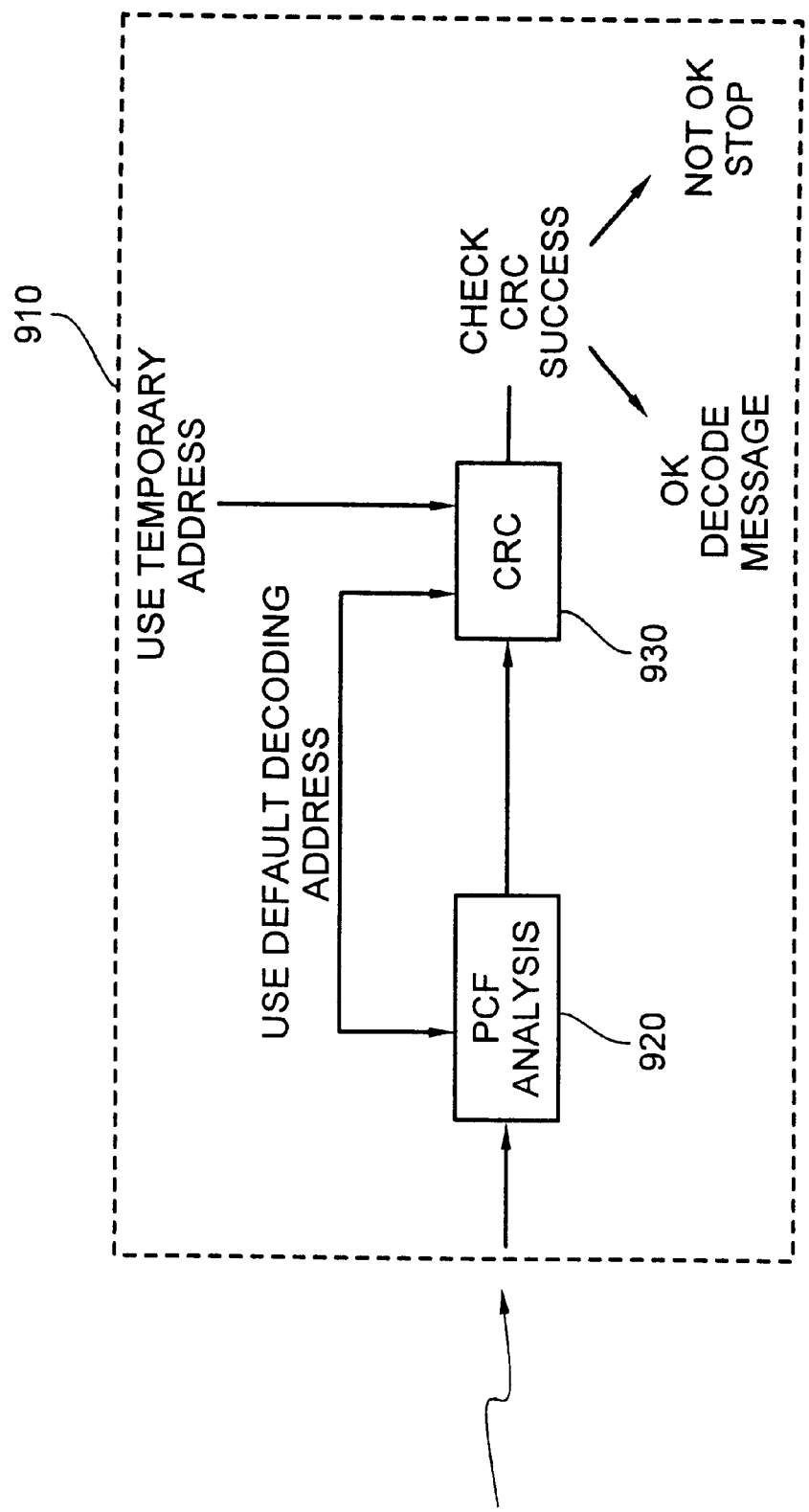
FIG. 9 illustrates a mobile station according to a second embodiment of the present invention.

According to a second alternative embodiment of the present invention, the multicast address is set to be equivalent to the idle status indication sequence for the PCCH (i.e., a sequence of 0's). FIG. 9 illustrates a block diagram of a mobile station according to this embodiment. The mobile station 910 includes a PCF analysis unit 920 and a CRC engine 930. As will be explained in more detail below with respect to FIG. 10, the PCF analysis unit 920 checks the PCF's assignment sub-field for the presence of the multicast address. In those instances where the multicast address is present, the mobile station performs the CRC operation on the received PDU using its default decoding address.

Figure 10:
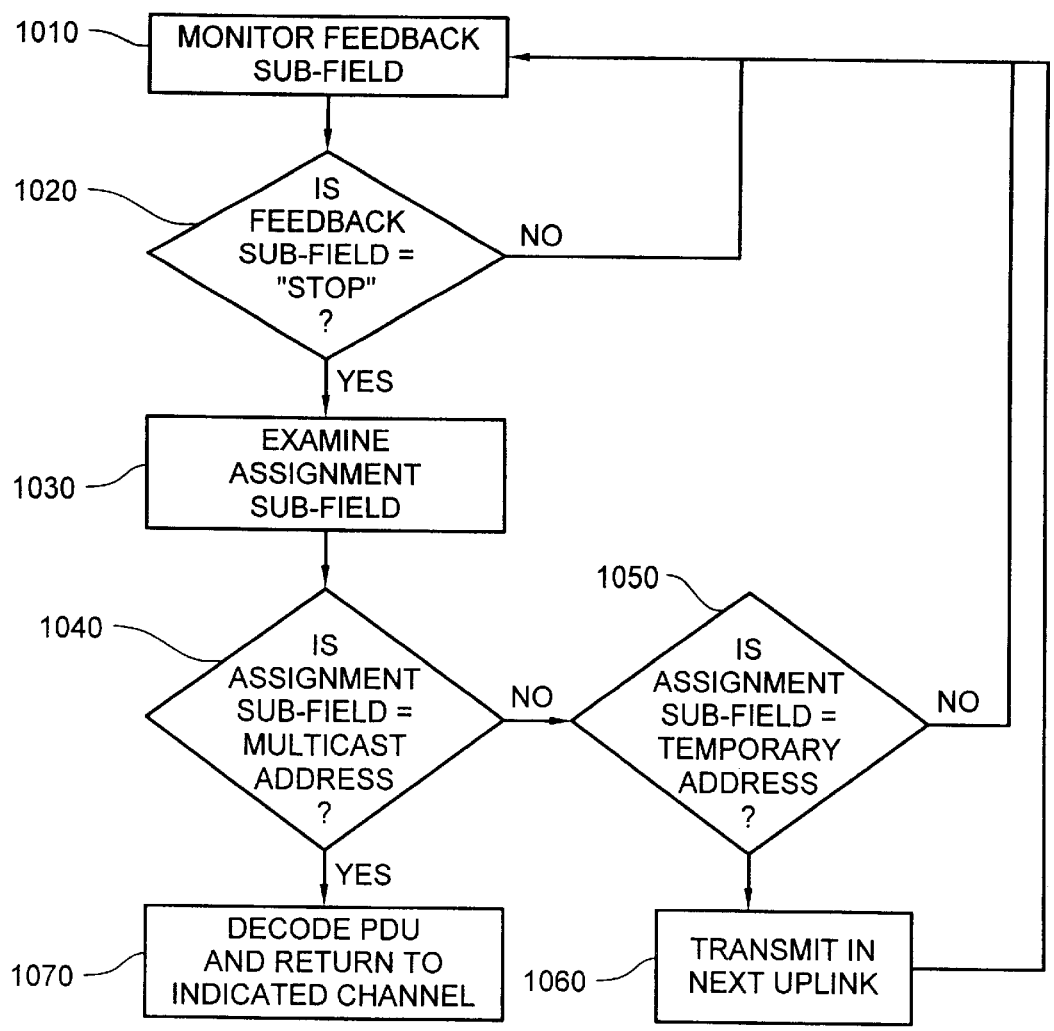
FIG. 10 illustrates the packet traffic channel deallocation process according to the second embodiment of the present invention.

FIG. 10 illustrates the PTCH deallocation process according to the second embodiment of the present invention. As indicated above, all mobile stations which are active on a PTCH continuously monitor the PCF's feedback sub-field (step 1010) in downlink transmissions from the network. The feedback sub-field is examined to determine whether a "stop" indication has been sent by the network (step 1020). If not, each mobile station monitors the next downlink feedback sub-field (step 1010). When the network sends a "stop" indication, the active mobiles examine the assignment sub-field (step 1030). In those situations where PTCH resources are to be removed, the assignment sub-field contains the multicast address. When the mobile stations detect the presence of the multicast address in the PCF analysis unit (step 1040), the mobile stations decode the PDU using their default decoding address (step 1070). The PDU, in this case, will include reassignment information indicating that the mobile stations are to switch to another channel. The channel may be the PCCH on which the mobile stations were originally camped, another PCCH or another PTCH. As a result, the packet data resources can be quickly deallocated in favor of voice services and active mobile stations may be quickly reassigned to another channel.

In those situations where the address in the assignment sub-field is not the multicast address, each active mobile station determines whether the assignment sub-field contains an address equal to their own temporary address (step 1050). In those situations where the assignment sub-field does not equal a mobile station's temporary address, then the next reserved uplink slot is not intended for that mobile station and the mobile monitors the feedback sub-field in the next downlink transmission. If the address in the assignment sub-field is equal to the mobile station's temporary address, then the next uplink is reserved for the mobile station to transmit (step 1060). After transmitting, the mobile station returns to step 1010 and monitors the feedback sub-field in the next downlink transmission.

Figure 11:
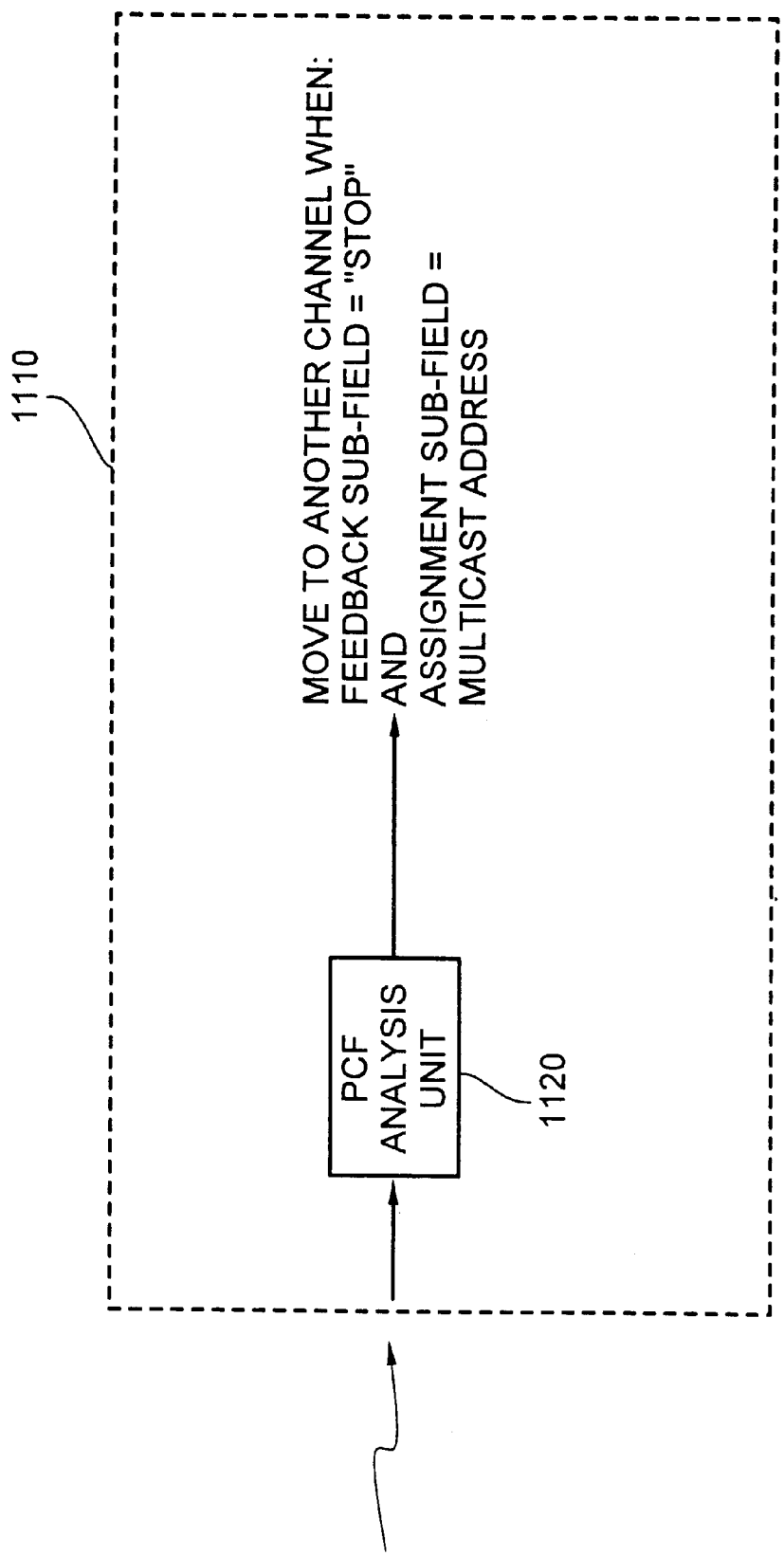
FIG. 11 illustrates an exemplary mobile station according to a third embodiment of the present invention.

FIG. 11 illustrates an exemplary mobile station according to a third embodiment of the present invention. The multicast address is again set to be equivalent to the idle status indication sequence for the PCCH (i.e., a sequence of 0's).

The mobile station 1110 of FIG. 11 includes a PCF analysis unit 1120 which, among other things, detects the presence of the multicast address. As has been set forth in detail above, each mobile station that is active on a PTCH monitors the PCF field in the downlink. When PTCH resources are to be removed, the PCF's feedback sub-field is set to "stop" which indicates to the active mobile stations that they are to examine the assignment sub-field. When the multicast address is detected in the assignment sub-field, this indicates that the mobile stations are to move to another channel. As a default setting, each mobile station could, in response to a detection of the multicast address in the assignment sub-field, automatically switch back to the PCCH on which they were originally camped. This would eliminate the need for transmission of a Channel Reassignment message.

The number of times that the multicast address is transmitted in the downlink depends on the capabilities of the mobile stations which are active on the packet traffic channel. The following examples illustrate this dependency. Suppose that only one PTCH carrier is available which has three time slots per frame. If, for example, three triple rate mobile stations are active on the PTCH (i.e., mobile stations which read all three time slots of each frame), then the multicast address need only be sent in the first time slot. Since a TDMA frame is 20 ms, the time to deallocate the PTCH in this situation would be approximately 7 ms.

In the alternative, if each of the three mobile stations read only one time slot (e.g., mobile 1 reads time slot 1, mobile 2 reads time slot 2, etc.), then the multicast address should be sent in all three time slots so that all mobiles are notified of the PTCH deallocation. As a result, the time for deallocation of the packet data service would be 20 ms. In either situation (i.e., where the multicast address is sent in only one time slot or sent in all three time slots), the time to deallocate PTCH is significantly below the acceptable 100 ms switch over period described above.

Even in those situations where only triple rate mobile stations are active on a PTCH which is to be deallocated, it is preferable that the multicast message be sent on all time slots because, due to, for example, fading, the message may not be received by one of the mobile stations. There will always be a risk of mobile stations not receiving the redirect message, but the number of such mobiles are expected to be low and since the PTCH is a reserved access channel, the mobiles will eventually regain access to the PCCH. The present invention reduces the number of mobile users which will have to regain access. With the use of a point-to-multipoint signalling message at the PTCH, the network may reallocate the PTCH resource within a minimum amount of time (e.g., one time slot per PTCH channel removed) without significantly affecting the PTCH mobiles perceived latency during the operation.

While the above-described embodiments set forth that a traffic channel be allocated for either packet data or voice services, one skilled in the art will appreciate that a traffic channel may be allocated for both packet data and voice services (e.g., specific time slots may be allotted for packet data transmissions and specific time slots may be allotted for voice transmissions). In fact, the short amount of time provided by the present invention in which packet data services may be deallocated provides a greater opportunity for providing traffic channels having interleaved packet data and voice services.

The foregoing has described the principles, preferred embodiments and modes of operation of the present invention. However, the invention should not be construed as being limited to the particular embodiments discussed above. While the above-described embodiments were provided using TDMA, one skilled in the art will appreciate that the present invention may be practiced in any of a number of different protocols such as CDMA, FDMA, etc. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A method of deallocating at least one packet traffic channel to which a plurality of mobile stations have reserved access, said method comprising the steps of:
   monitoring, by each of the plurality of mobile stations, a downlink transmission, said monitoring step comprising:
      monitoring, by each of the plurality of mobile stations, a packet channel feedback field in the downlink transmission, said packet channel feedback field comprising a feedback sub-field and an allocation sub-field; and
      examining, by each of the plurality of mobile stations, the allocation sub-field for the multicast address only when the feedback sub-field comprises a value indicating that the allocation sub-field is to be examined; and
   switching, by each of the plurality of mobile stations, to a different channel in response to the downlink transmission comprising a multicast address.

2. A method of deallocating at least one packet traffic channel to which a plurality of mobile stations have reserved access, said method comprising the steps of:
   monitoring, by each of the plurality of mobile stations, a downlink transmission;
   performing, by each of the plurality of mobile stations, a cyclic redundancy check on a packet data unit received in the downlink transmission using the multicast address;
   performing, by each of the plurality of mobile stations, a cyclic redundancy check on the packet data unit using a temporary address; and
   switching, by each of the plurality of mobile stations, to a different channel in response to the downlink transmission comprising a multicast address, wherein said switching step is performed in response to a successful step of performing the cyclic redundancy check using the multicast address.

3. The method of claim 1 wherein the multicast address is a sequence of zeros (0's).

4. The method of claim 2 wherein the multicast address is one of a group of temporary addresses that can be assigned to the plurality of mobile stations.

5. The method of claim 1 wherein the multicast address is transmitted in at least one time slot of the downlink transmission.

6. The method of claim 5 wherein the multicast address is transmitted in only one time slot of the downlink transmission.

7. A mobile station comprising:
   means for monitoring a downlink transmission on a packet traffic channel, said means for monitoring comprising:
      means for monitoring a packet channel feedback field in the downlink transmission, said packet channel feedback field comprising a feedback sub-field and an allocation sub-field; and means for examining the allocation sub-field for the multicast address only when the feedback sub-field comprises a value indicating that the allocation sub-field is to be examined; and means for switching to a different channel in response to the downlink transmission comprising a multicast address.

8. A mobile station comprising:

means for monitoring a downlink transmission on a packet traffic channel;

a first cyclic redundancy check engine for performing a cyclic redundancy check on a packet data unit received in the downlink transmission using the multicast address;

a second code redundancy check engine for performing a cyclic redundancy check on the packet data unit using a temporary address; and means for switching to a different channel in response to the downlink transmission comprising a multicast address, wherein said switching means switches to a different channel in response to successfully performing the cyclic redundancy check using the multicast address.

9. The mobile station of claim 8 wherein the multicast address is a sequence of zeros (0's).

10. The mobile station of claim 9 wherein the multicast address is one of a group of temporary addresses that can be assigned to mobile stations that have reserved access to the packet traffic channel.

11. The mobile station of claim 8 wherein the multicast address is transmitted in at least one time slot of the downlink transmission.

12. The mobile station of claim 11 wherein the multicast address is transmitted in only one time slot of the downlink transmission.

13. A method of deallocating at least one packet traffic channel to which a plurality of mobile stations have reserved access, said method comprising the steps of:

monitoring, by each of the plurality of mobile stations, a packet channel feedback field in a downlink transmission, said packet channel feedback field comprising a feedback sub-field and an assignment sub-field;

examining, by each of the plurality of mobile stations, the assignment sub-field when the feedback sub-field contains a predetermined value; and switching, by each of the plurality of mobile stations, to a different channel in response to the assignment sub-field comprising a predetermined indication value.

14. The method of claim 13 wherein the different channel is a packet control channel.

15. The method of claim 14 wherein the packet control channel is defined by default.

16. A system for deallocating at least one packet traffic channel in a radiocommunication system, said system comprising:

a network that transmits and receives data on the at least one packet traffic channel; and a plurality of mobile stations that have reserved access to the at least one packet traffic channel, each of said plurality of mobile stations comprising:

means for monitoring a packet channel feedback field in a downlink transmission from the network, said packet channel feedback field comprising a feedback sub-field and an assignment sub-field;

means for examining the assignment sub-field when the feedback sub-field contains a predetermined value; and means for switching to a different channel in response to the assignment sub-field comprising a predetermined indication value.

17. The system of claim 16 wherein the different channel is a packet control channel.

18. The system of claim 17 wherein packet control channel is defined by default.

* * * * *